No. 754,601.

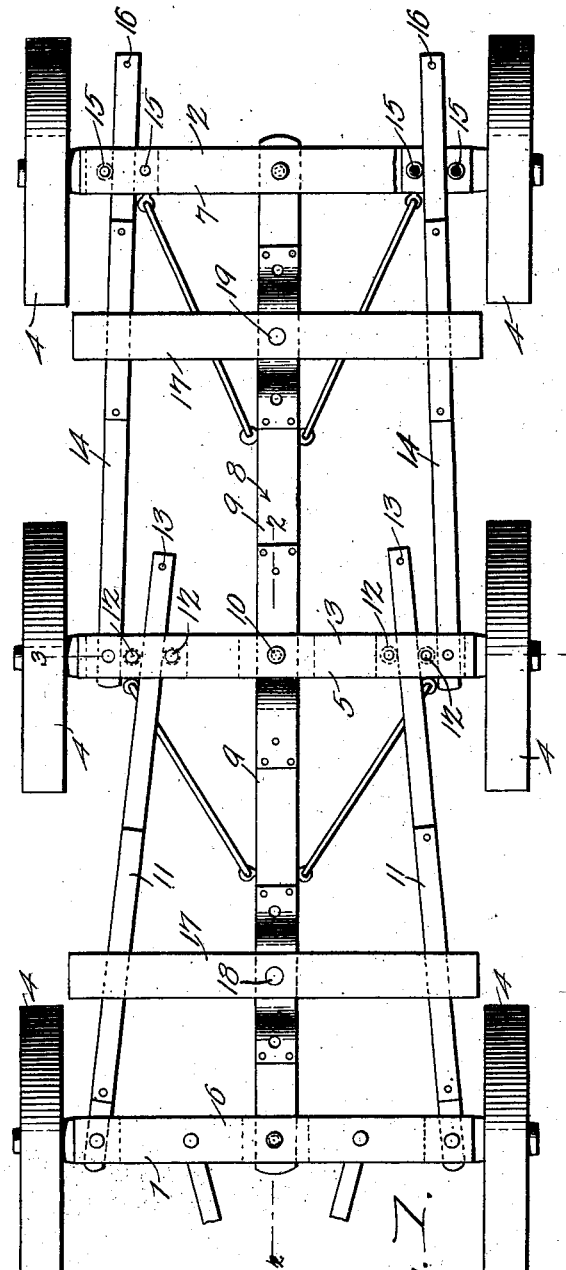

Patented March 15, 1904.

UNITED STATES PATENT OFFICE.

BENJAMIN FRANKLIN PADGETT, OF LAUREL, MISSISSIPPI.

LUMBER-WAGON.

SPECIFICATION forming part of Letters Patent No. 754,601, dated March 15, 1904.

Application filed November 3, 1903. Serial No. 179,713. (No model.)

*To all whom it may concern:*

Be it known that I, BENJAMIN FRANKLIN PADGETT, a citizen of the United States, residing at Laurel, in the county of Jones and State of Mississippi, have invented a new and useful Lumber-Wagon, of which the following is a specification.

My invention relates to lumber or logging wagons of the type employed for hauling logs or lumber of great length. These wagons, owing to their extreme length, are usually provided with one or more supplemental axles having transporting-wheels. In the prior construction of these vehicles the running-gear connecting the axles has been of a rigid inflexible character which not only rendered turning of the vehicle difficult, but also prevented the intermediate wheels from properly and freely overriding obstructions and surface irregularities.

The present invention has for its object to overcome these objectionable features and also to provide for a proper distribution of the weight of the load between the axles and this without materially complicating the structure or increasing its cost.

To these ends the invention comprises the novel features of construction and combination of parts more fully hereinafter described.

In the accompanying drawings, Figure 1 is a top plan view of a wagon embodying my invention. Fig. 2 is a central longitudinal section on the line 2 2. Fig. 3 is a transverse section on the line 3 3.

Referring to the drawings, 1 designates the front axle, 2 the rear axle, and 3 the central supplemental axle, of my improved wagon, all of which axles are provided with transporting-wheels 4 of the usual or any preferred construction. Extending longitudinally of and spaced vertically above the central axle is a bar or member 5, while similar bars or members 6 7 are disposed above the front and rear axles, respectively.

The axles are connected by a central reach-beam 8, pivoted at its front and rear ends by vertical bolts to the front and rear axles between the latter and their overlying bars. This reach is composed of a pair of sections 9, disposed in parallel end-to-end relation with their meeting ends lying one above the other and having their adjacent faces oppositely beveled and slightly reversely curved, said ends being pivotally connected by a vertical bolt 10, extending through the bar 5 and its underlying axle.

Extending between the front and central axles, one upon either side of the central reach, is a pair of side connecting-bars or coupling members 11, pivoted at their forward ends between the axle 1 and overlying bar 6 by suitable bolts and extending at their rear ends each between a pair of vertically-pivoted rollers 12, carried by the central axle, these connecting-bars being free for longitudinal sliding movement between the rollers and provided at their rear terminals, which project a suitable distance in rear of the central axle, with engaging pins or members 13, designed upon the forward movement of the bars to contact with the axle and prevent escape of the bars from between their guide-rollers.

14 designates a pair of bars similar to bars 11, but extending between the central and rear axles. These bars are pivoted at their forward ends to the central axle and extend at their rear ends between vertical pivoted rollers 15, carried by the rear axle between the latter and its overlying bar 7. The bars 14 are, as in the case of bars 11, free for longitudinal play between the rollers and have their rear terminals provided with stop members 16, which upon the forward movement of the bars engage the rear axle. It may here be remarked that by this construction of running-gear a free turning of the vehicle is permitted and that during the turning operation one pair of the side bars will be drawn forwardly in their guides, thus becoming extended in length, while those of the opposite side of the vehicle will run backward in their guides, thus becoming shortened. It is also to be noted that in overriding obstructions and surface irregularities each of the axles is susceptible of an upward movement independently of the others, due to the manner of connecting the reach-beam sections with the central axle.

In order to obtain a proper distribution of the weight of the load, I remove the bolsters 17 from over the axles where they are usually placed and mount them on the running-gear between the axles, the front bolster being pivoted by a bolt 18 to the central reach-beam at a point somewhat in rear of the front axle, while the rear bolster is similarly pivoted by a bolt 19 to said reach-beam at a point in advance of the rear axle. It is apparent from this arrangement that the axles will all be relieved of the direct weight of the bolsters and that the weight of the latter and the load will consequently be equally distributed.

From the foregoing it will be seen that I produce a device of comparatively simple construction which is admirably adapted for the attainment of the ends in view; but it is to be understood that I do not limit myself to the precise details herein set forth, inasmuch as minor changes may be made therein without departing from the spirit of the invention.

Having thus described my invention, what I claim is—

1. In a lumber-wagon, the combination with front and rear axles, of an intermediate axle, a reach-beam extending between the axles and composed of a pair of sections pivotally connected together and to the intermediate axle to permit free independent movement of the axles in a vertical plane, coupling-bars pivoted to the front and slidingly engaging the intermediate axle, and analogous couplings pivoted to the central and slidingly engaging the rear axle, whereby said couplings form a continuous connection between all the axles.

2. In a lumber-wagon, the combination with front and rear axles, of guides carried by the latter, an intermediate axle, guides carried thereby, a reach-beam extending between the axles and comprising a pair of sections pivotally connected together and to the intermediate axle to permit free independent movement of the axles in a vertical plane, coupling-bars pivoted to the front axle and extending loosely through the intermediate guides, and analogous couplings pivoted to the intermediate axle and extending loosely through the rear guides, whereby said couplings form a continuous connection between all the axles.

3. In a lumber-wagon, the combination with front and rear axles, of vertical guide-rollers carried by the latter, an intermediate axle, vertical guide-rollers carried thereby, a reach-beam extending between the axles and comprising a pair of sections pivotally connected together and to the intermediate axle to permit free independent movement of the axles in a vertical plane, coupling-bars pivoted to the front axle and extending loosely between the intermediate guide-rollers, and analogous couplings pivoted to the intermediate axle and extending loosely between the rear guide-rollers, whereby said couplings form a continuous connection between all the axles.

4. In a lumber-wagon, the combination with front and rear axles, of an intermediate axle, a reach-beam extending between the axles and composed of a pair of sections having their meeting ends one overlying the other and reversely curved, said sections being pivotally connected together and to the intermediate axle, coupling-bars pivoted to the front and slidingly engaging the intermediate axle, and analogous couplings pivoted to the intermediate and slidingly engaging the rear axle.

In testimony that I claim the foregoing as my own I have hereto affixed my signature in the presence of two witnesses.

BENJAMIN FRANKLIN PADGETT.

Witnesses:
L. B. McCarty,
Geo. O. Parker.